(12) United States Patent
Lee et al.

(10) Patent No.: US 11,672,199 B2
(45) Date of Patent: Jun. 13, 2023

(54) MAPPING METHOD OF LAWN MOWER ROBOT

(71) Applicant: LG ELECTRONICS INC., Seoul (KR)

(72) Inventors: Jaekwang Lee, Seoul (KR); Jeongwoo Ju, Seoul (KR); Dongki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 16/896,610

(22) Filed: Jun. 9, 2020

(65) Prior Publication Data

US 2021/0168996 A1 Jun. 10, 2021

(30) Foreign Application Priority Data

Dec. 6, 2019 (KR) .......................... 10-2019-0161500

(51) Int. Cl.
*A01D 34/00* (2006.01)
*G05D 1/00* (2006.01)
(Continued)

(52) U.S. Cl.
CPC ......... *A01D 34/008* (2013.01); *G05D 1/0044* (2013.01); *G05D 1/0212* (2013.01);
(Continued)

(58) Field of Classification Search
CPC .. A01D 34/008; G05D 1/0044; G05D 1/0212; G05D 1/0274; G05D 1/0278;
(Continued)

(56) References Cited

U.S. PATENT DOCUMENTS

2005/0165521 A1 7/2005 Gruhn
2011/0153136 A1 6/2011 Anderson
(Continued)

FOREIGN PATENT DOCUMENTS

CN 208021748 U 10/2018
EP 3 367 199 A1 8/2018
(Continued)

OTHER PUBLICATIONS

Korean Notice of Allowance dated Jun. 1, 2021 issued in Application 10-2019-0161500.
(Continued)

*Primary Examiner* — Bao Long T Nguyen
(74) *Attorney, Agent, or Firm* — KED & Associates LLP

(57) ABSTRACT

A mapping method of a lawn mower robot may include a first image mapping operation of generating a first travel image of a three-dimensional region based on an aerial image of a work target region, a first map displaying operation of dividing the first travel image into a mowing region and an obstacle region, converting the first travel image into a first travel map, and displaying the first travel map. The mapping method may include a first anchor displaying operation of recommending the number and installation locations of anchors on the first travel map, an anchor location determination operation of determining whether the anchors are installed at the installation locations, and a path generation operation of generating a travel path of the lawn mower robot on the first travel map. The mapping method may improve work efficiency of the lawn mower robot.

7 Claims, 10 Drawing Sheets

(51) Int. Cl.
  *G05D 1/02* (2020.01)
  *G06V 20/10* (2022.01)
(52) U.S. Cl.
  CPC ......... *G05D 1/0274* (2013.01); *G05D 1/0278* (2013.01); *G06V 20/188* (2022.01); *G05D 2201/0208* (2013.01)
(58) Field of Classification Search
  CPC ... G05D 2201/0208; G05D 2201/0234; G06V 20/188; G06V 20/10; G06V 20/17; G06V 20/13; G06T 2207/30261; B25J 9/1664; B25J 9/1692; B25J 9/1697; B25J 11/008; G09B 29/003; G01C 21/3804; G01C 21/3852
  See application file for complete search history.

(56) References Cited

U.S. PATENT DOCUMENTS

| | | | |
|---|---|---|---|
| 2012/0019627 A1 | 1/2012 | Choi et al. | |
| 2016/0193729 A1* | 7/2016 | Williams | G05D 1/0274 901/1 |
| 2017/0344024 A1 | 11/2017 | Grufman et al. | |
| 2018/0035606 A1* | 2/2018 | Burdoucci | H04N 5/232935 |
| 2018/0364045 A1* | 12/2018 | Williams | G01S 17/88 |

FOREIGN PATENT DOCUMENTS

| | | |
|---|---|---|
| JP | 2000-283784 A | 10/2000 |
| JP | 2011-138502 A | 7/2011 |
| KR | 10-2015-0123499 A | 11/2015 |
| KR | 10-2017-0048815 | 5/2017 |
| WO | WO 2017/091008 | 6/2017 |
| WO | WO 2018/013538 A1 | 1/2018 |

OTHER PUBLICATIONS

Korean Office Action dated Dec. 8, 2020 issued in Application 10-2019-0161500.
PCT International Search Report dated Dec. 17, 2020 issued in Application PCT/KR2020/010334.

* cited by examiner

MAPPING METHOD OF LAWN MOWER ROBOT

CROSS-REFERENCE TO RELATED APPLICATION

This application claims the benefit of Korean Patent Application No. 10-2019-0161500, filed in Korea on Dec. 6, 2019, the subject matter of which is hereby incorporated by reference.

BACKGROUND

1. Field

The present disclosure relates to a method for generating a map of a lawn mower.

2. Background

Robots have been developed for industrial use and have been a part of factory automation. In recent years, with further expansion of the application of robots, medical robots, aerospace robots, and the like have been developed, and home robots that can be used in homes have also been made. Among these robots, a moving robot capable of autonomously traveling is called a mobile robot. A lawn mower robot is a representative example of a mobile robot used in an outdoor environment of a home.

A lawn mower is a device designed to trim the grass planted in the yard of a home or a playground. Such lawn mowers may be divided into household mowers used in homes and tractors used in large playgrounds or farms.

In busy daily life, it is difficult for the user to directly operate the lawn mower to mow the lawn in the yard. For this reason, a person to mow the lawn may be hired, which may result in employment costs.

An automatic robot-type lawn mower has been developed to prevent incurrence of such additional costs and save the user's effort. Various studies have been conducted to control such an automatic robot-type lawn mower to stay in a desired area.

In order to automatically mow the lawn in the garden or the like, it is important to accurately input information on the area where mowing is to be performed. There may be a variety of ways to receive information on a work area where mowing is to be performed.

For example, Patent Document 1 (Korean Patent Application Publication No. 10-2017-0048815 (May 10, 2017)), the subject matter of which is incorporated herein by reference, discloses a method of updating an indoor environment map of a cleaning robot by comparing an indoor map created by the cleaning robot with an indoor environment map created by an aerial vehicle. Patent Document 2 (US Patent Application Publication No. US 2017/0344024 (Nov. 30, 2017)), the subject matter of which is incorporated herein by reference, discloses a method of generating a map using an IMU sensor or the like.

Patent Document 1 relates to a cleaning robot, and discloses that an aerial vehicle photographs the interior. Accordingly, Patent Document 1 is rather irrelevant to setting a travel map of a lawn mower robot. Patent Document 2 discloses using an IMU sensor. Thus, with Patent Document 2, it is difficult to form a planar map.

Even if a planar map is formed, the accuracy of the map may be lowered.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary embodiments of the present disclosure may be described with reference to the drawings. The following detailed description is provided to assist in a comprehensive understanding of the methods, devices, and/or systems described herein. However, this is merely an example and the present disclosure is not limited thereto.

In describing embodiments of the present disclosure, a detailed description of known technology may be omitted to avoid obscuring the subject matter of the present disclosure. Terms which will be used below are defined in consideration of the functions of the corresponding elements in the present invention. The definitions of the terms may vary depending on intention of a user or an operator, customs, or the like. Therefore, the terms should be defined based on the disclosure throughout the specification. The terminology used in the detailed description is merely intended to describe embodiments of the disclosure and should not be construed as limiting. The singular forms include plural referents unless context clearly dictates otherwise. In this specification, terms such as "includes" or "has" are intended to indicate existence of characteristics, figures, steps, operations, constituents, components, parts thereof, or combinations thereof disclosed in the specification. The terms "includes" or "has" should be understood as not precluding existence or possibility of one or more other characteristics, figures, steps, operations, constituents, components, parts thereof, or combinations thereof.

Figure 1:
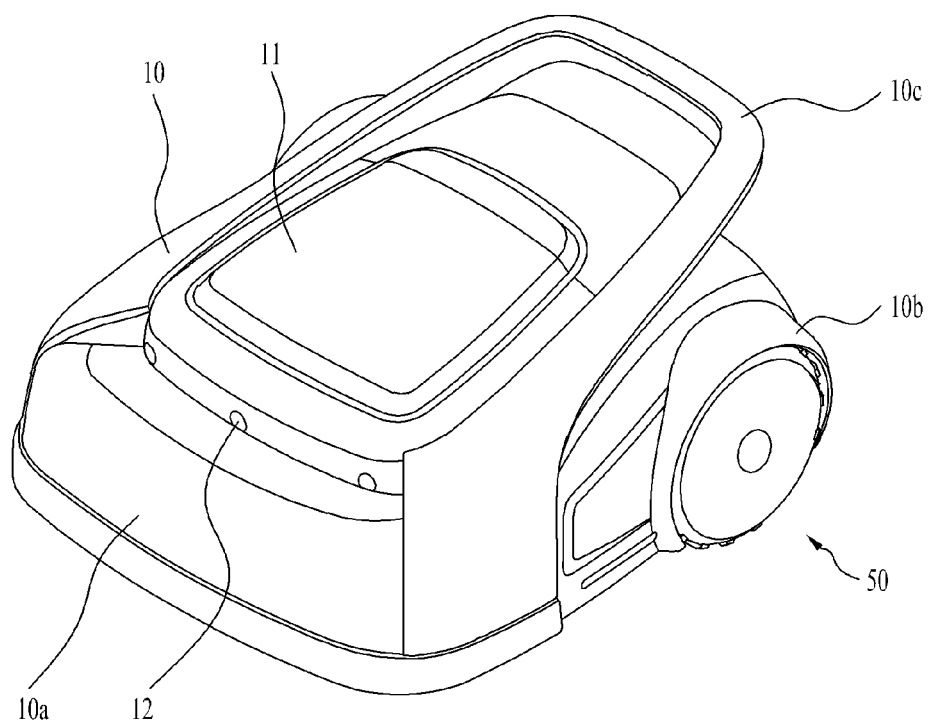
FIG. 1 is a perspective view of a lawn mower robot according to an embodiment.
Figure 2:
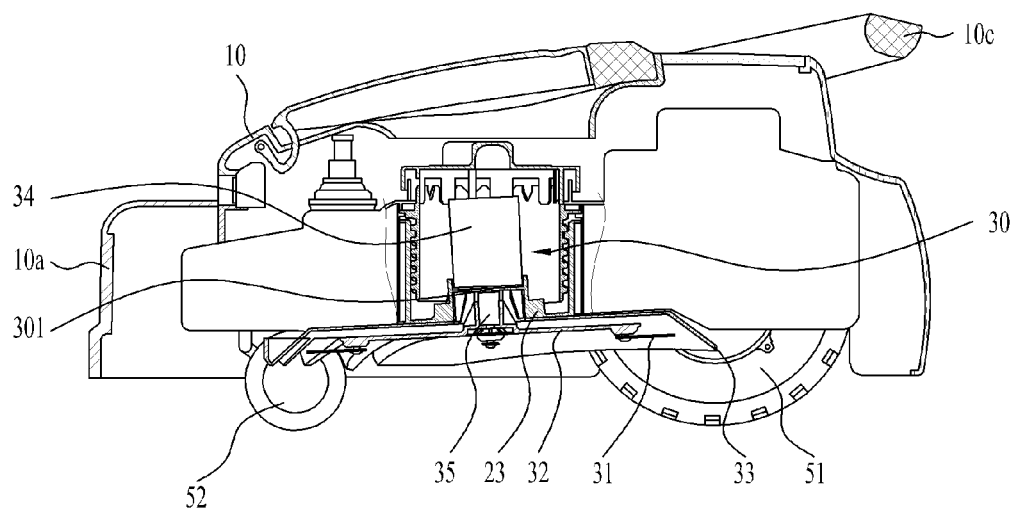
FIG. 2 is a cross-sectional view of the lawn mower robot according to the embodiment.

FIG. 1 is a perspective view of a lawn mower robot according to an embodiment. FIG. 2 is a cross-sectional view of the lawn mower robot according to the embodiment. The structure of the lawn mower robot according to the present embodiment may have parts, the description of which is omitted for clear understanding of the disclosure and convenience of explanation. A lawn mower robot 1 may include an outer cover 10 and an inner body 20. The outer cover 10 is configured to surround the outside of the inner body 20 and defines the exterior of the robot. Since a blade 31 configured to rotate at a high speed is mounted in the outer cover 10, the outer cover 10 is a structure that prevents a person's hand or foot from entering the inside to protect the person from an impact caused by rotation of the blade 31. The lower end of the outer cover 10 should be spaced apart from the ground by a predetermined height in accordance with the safety standards.

If the lower end of the outer cover 10 is positioned excessively high above the ground, a person's hand or foot may enter the space below the cover and thus may be fatally injured. If the lower end of the outer cover 10 is positioned excessively close to the ground, the load may increase during mowing of the lawn.

The outer cover 10 may include a display module and an input unit. The display module and the input unit may be arranged on the outside of the outer cover 10. However, embodiments are not limited thereto, and the display module and the input unit may be covered by an opening and closing part 11 as shown in FIG. 1.

For example, the opening and closing part 11 may be hinged to the outer cover 10. Thus, the opening and closing part 11 may keep the display module and the input unit covered in normal times, and may be opened when the display module and the input unit need to be used. Accordingly, when the lawn mower robot 1 moves, the display module or the input unit may be prevented from being accidentally pressed and operated due to an obstacle or an external impact.

The outer cover 10 includes a bumper 10a that may hit an obstacle ahead and a fender 10b forming a uniform curved surface on the rear on both sides to allow a driving part 50 to be mounted. The bumper 10a is arranged to surround the front end portion and the front side portions of the outer cover 10 and is thicker than the other parts. The fender 10b is arranged to surround the outer surface of the driving part 50 and is wider than any other part.

The bumper 10a may be formed by connecting the front surface and the left and right side surfaces thereof to each other. The front and side surfaces of the bumper 10a are roundly connected.

A sensor 12 may be arranged in the front of the outer cover 10. The sensor 12 may be configured to detect an obstacle ahead to reduce the driving speed of the driving part 50.

A handle 10c may be provided on an upper portion of the outer cover 10. The handle 10c may have both side portions inclined upward from the front top on both sides of the outer cover 10 toward the rear side, and a rear end portion protruding upward to the rear side of the outer cover 10 and forming a closed curved surface.

For example, the handle 10c may be formed in a "U" shape as shown in FIG. 1. In order to ensure safety of the user when the lawn mower robot is carried, the handle 10c allows the blade 31 (positioned at the bottom of the inner body 20) to face away from the user outside when the handle 10c is lifted up. However, embodiments are not limited thereto. The handle 10c may be formed in various shapes.

The outer cover 10 may be disposed such that the front and rear surfaces and left and right side surfaces thereof are spaced apart from the front, rear, and left and right sides of the inner body 20. The outer cover 10 may be mounted on the inner body 20 so as to be movable in any direction when colliding with an obstacle, and may absorb an impact from the obstacle.

The inner body 20 defines an inner space. The lawn mower robot 1 includes the driving part 50 configured to move the inner body 20 with respect to a travel surface. The driving part 50 may include a front wheel part 52 and a rear wheel part 51. The inner body 20 is supported by the front wheel part 52 and the rear wheel part 51.

Each of the front wheel part 52 and the rear wheel part 51 may be provided in pairs. However, embodiments are not limited thereto. As the size of the lawn mower robot increases, three or more wheels may support the lawn mower robot 1 to support the weight thereof. For simplicity, it is assumed that one pair of wheels is provided.

Each of the wheels provided on both sides of the rear wheel part 51 is configured to rotate independently of the other one. More specifically, the wheels may be configured to rotate independently of each other to enable the inner body 20 to make a rotational movement and a rectilinear movement with respect to the ground.

For example, when the wheels provided in the rear wheel part 51 rotate at the same rotation speed, the lawn mower robot 1 may make a rectilinear movement. When the wheels rotate at different speeds, the lawn mower robot may rotate.

The rear wheel part 51 may be larger than the front wheel part 52. Since power is transmitted by the rear wheel part 51, the rear wheel part 51 may be formed to be larger than the front wheel part 52. However, embodiments are not limited thereto. Separate power may be applied to the front wheel part 52 to operate in a four-wheel drive mode.

The lawn mower robot 1 includes a work part 30 configured to perform a predetermined task. The work part 30 may include a blade 31, a rotating plate 32, a motor 34, a power transmission part 35, and a protective cover 33.

The blade 31 may be very important in improving the grass cutting quality. The blade 31 may be formed in the shape of a rectangular plate which is long in the longitudinal direction and narrow in the widthwise direction while having a constant thickness. The blade 31 may be formed to have a constant width along the longitudinal direction. Since the width of the blade 31 is constant, rigidity of the blade 31 may be uniform along the longitudinal direction, and thus durability may be improved.

The protective cover 33 may prevent the user's hand from being injured by the blade 31. The protective cover 33 may radially extend from the upper side of the circumferential surface of the rotating plate 32 to extend to the upper side of the blade 31.

The rotating plate 32 is a component configured to rotate a plurality of blades 31 mounted thereon. The rotating plate 32 is rotatably mounted on the bottom of the inner body 20. A drive motor configured to rotate the rotating plate 32 may be provided inside the inner body 20, and the motor 34 is connected to the center of the rotating plate 32 via a rotational shaft 301 to rotate the rotating plate 32.

An accommodation portion 23 may be formed at the center of the inner body 20 to support the blade 31 and the motor 34, and may accommodate the power transmission part 35.

The rotating plate 32 may be disposed so as to be inclined downward with respect to a horizontal plane in a travel direction of the inner body 20. The blade 31 mounted on the rotating plate 32 may be disposed parallel to the rotating plate 32, and thus may be inclined downward with respect to the horizontal plane.

Figure 3:
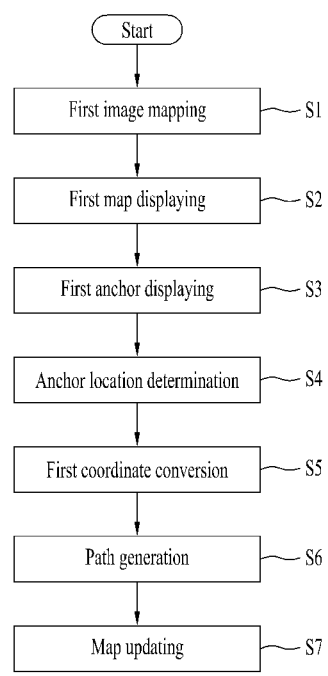
FIG. 3 illustrates a mapping method of the lawn mower robot according to an embodiment.

The lawn mower robot may include a communication module. The communication module may communicate with an aerial image capturing unit and a server, which may be described below. FIG. 3 illustrates a mapping method of the lawn mower robot according to an embodiment. A description may be given with reference to FIGS. 3-7.

In the present specification, the expression "work target region" does not necessarily refer to a region where the lawn mower robot performs mowing. The work target region refers to a region including a mowing region where mowing is to be performed and an obstacle region where mowing cannot be performed, as will be described below.

For example, when there is a region that has a width of 4 m and a height of 4 m, and contains two regions each having an area of 1 m² where mowing cannot be performed, the work target region may be represented as a region having the area of 16 m². The mowing region may be represented as a region corresponding to 14 m², and the obstacle region may be represented as a region corresponding to 2 m².

In order to carry out a mapping method described below, the lawn mower robot may need an aerial image capturing unit. A database for identifying the lawn may be needed. The database may be provided in the form of a server to be updated. The database or server does not necessarily need to be formed separately from the lawn mower robot, but may be integrated with the lawn mower robot.

A controller may be required to reconstruct the travel image of a 3-dimensional (3D) region from an aerial image captured by the aerial image capturing unit and provide a travel map to the user.

The controller may be installed in the lawn mower. Therefore, the aerial images received through the communication module may be converted into a travel area of the 3D region, which may be overlaid on the aerial image viewed from above and provided to the user.

The controller is not necessarily installed in the lawn mower robot, and may be provided separately from the lawn mower robot. For example, the controller may be included in a server installed at a place other than the work target region or the like, and may be provided as a single control device.

The mapping method of the lawn mower robot according to this embodiment may include a first image mapping operation S1, a first map displaying operation S2, a first anchor displaying operation S3, an anchor location determination operation S4, and a path generation operation S6.

The first image mapping operation S1 is an operation of generating a first travel image of a 3D region where the lawn mower robot is allowed to travel, based on an aerial image obtained by photographing a work target region.

The aerial image of the work target region may be captured by the aerial image capturing unit. The aerial image capturing unit may employ a variety of aerial vehicles, such as a drone, an unmanned helicopter or an unmanned aerial vehicle.

Embodiments are not limited to the above-described example. Other sensors such as LiDAR may be used to capture an aerial image.

When a work target region is photographed at various angles by the aerial image capturing unit that is flying in the air, a first travel image may be generated. If a map provided by an application or a website is used without using the aerial image capturing unit, inconvenience may be caused in making a substantial plan for mowing because it is difficult to reflect the current state according to the update cycle.

The first image mapping operation S1 may include a collection operation, a matching operation, and a reconstruction operation. The collection operation may be an operation of collecting a plurality of aerial images captured by the aerial image photographing unit as described above. The aerial images may be collected by the controller. As described above, the controller may be provided in the lawn mower robot or may be separate from the lawn mower robot.

The reconstruction operation may be an operation of generating a first travel image of a 3D region by extracting and matching feature points based on the multiple collected aerial images. Since the aerial images are images captured while the aerial image capturing unit is flying, the aerial images may be captured while the work target region is viewed from different angles.

Feature points of the work target region may be extracted based on the multiple captured aerial images. The feature points of the aerial images may be matched with each other to reconstruct a 3D terrain.

The reconstruction operation may be an operation of generating a grid map using interpolation in matching the feature points. When the feature points are extracted and matched, the work target region may not be clearly presented. The first travel image may become more similar to the work target region through the reconstruction operation, thereby increasing the degree of precision.

The first map displaying operation S2 may be an operation of dividing the first travel image into a mowing region M (FIG. 5) to be mowed and an obstacle region O (FIG. 5) distinguished from the mowing region, converting the first travel image into a first travel map of a 2D region, and displaying the first travel map.

The first travel image is an image of a 3D region. Accordingly, it may be difficult for the user to easily identify the work target region. Therefore, the first map displaying operation S2 of converting the first travel image into the first travel map of the 2D region and displaying the first travel map may be performed.

When the first travel map is displayed, the mowing region and the obstacle region may be marked on the first travel map. Thus, the user may easily identify the mowing region to be mowed and the obstacle region where the mowing cannot be performed.

The mowing region of the work target region may be distinguished based on lawn information stored in the database. The database may store information about a lawn, and/or may be provided in the form of a server in which details of the lawn are updated.

The lawn information may include pattern (including color) and shape of the lawn according to the season, the pattern and shape according to the type of the lawn, and the pattern and shape according to the place where the grass of the lawn is grown. The lawn information may be stored in the database or the server.

A region where the lawn is present may be extracted based on the stored lawn information. More specifically, an outer boundary of a region where the lawn is present may be sensed to determine the region where the lawn is present.

Once the boundary of the region where the lawn is present is determined, a region where mowing cannot be performed in the region where the lawn is present may be distinguished. The region where mowing cannot be performed may be defined as an obstacle region.

The obstacle region may be a region in which no lawn is present or an inaccessible region that has a lawn but does not allow access of the lawn mower robot. The region where the lawn is present except for the obstacle region may be a mowing region. That is, a work target region may be determined by the boundary of the region where the lawn is present, and the obstacle region and the mowing region may be distinguished from each other in the work target region.

As described above, the obstacle region may include a region in which no lawn is present or an inaccessible region that has a lawn but does not allow access of the lawn mower robot. The region in which no lawn is present may be an area where trees, wells, structures, and the like are disposed and thus mowing does not need to be performed.

The region that does not allow access of the lawn mower robot may be an area located higher than the bumper of the lawn mower robot. However, access of the lawn mower robot is not allowed simply because the region is located higher than the bumper. The bumper may not always be the reference for determination of accessibility, and accessibility may be determined based on the height of the lawn mower robot or a region of a predetermined height.

For ease of discussion, the description may be based on the bumper. Even when a region is located higher than the bumper, the lawn mower robot may move to the region and perform the mowing operation when the region is inclined continuously to form a slope along which the lawn mower robot is movable.

Therefore, the inaccessible region that does not allow access of the lawn mower robot may be an area that is inclined as to form a slope that does not allow the lawn mower robot to move thereto and is located higher than the bumper. That is, a region having an inclination greater than a predetermined inclination may be distinguished as an obstacle region.

The first travel map may be overlaid and displayed on an aerial image captured from above the work target region and provided to the user. There is no limit to the methods of providing the map to the user. For example, the first travel map be provided to a user through a display provided in the lawn mower robot, or may be provided by a display of a control device provided separately from the lawn mower robot.

The first travel map may be visually provided such that the user may easily identify the work target region, the mowing region and/or the obstacle region. The first travel map may allow the user to modify the boundaries of the regions.

Therefore, when at least one of the mowing region, the obstacle region, and the work target region does not match the locations of the actual areas, the user may modify incorrect parts as desired. Since the first travel map is overlaid on an aerial image captured from above the work target region and provided to the user, the user may easily modify the incorrect parts.

The first anchor displaying operation S3 may be an operation of recommending the number and installation locations of anchors for recognition of the location of the lawn mower robot on the first travel map when the mowing region, the obstacle region, and the work target region are distinguished from each other.

An anchor A may be installed at a specific location in the work target region so as to recognize the location of the lawn mower robot.

The anchor A may communicate with the lawn mower robot. When triangulation is performed based on at least three anchors, the location of the lawn mower robot may be derived. When the mowing region and the obstacle region in the work target region are distinguished, the optimized number and installation locations of anchors A may be derived based on the mowing region and the obstacle region distinguished in the first travel map.

The number and installation locations of anchors A may depend on product performance of the anchor A. Information about the product performance of the anchor A may be input before generating the map. The number and installation locations of the anchors A may be recommended so as to recognize the location of the lawn mower robot in the work target region based on the minimum number of anchors A in the corresponding area.

The anchor location determination operation S4 may be an operation of determining whether the anchor A is installed at a location recommended in the first anchor displaying operation S3.

After the anchor A is installed, the work target region may be re-photographed through the aerial image capturing unit, and a second travel map generated based on the re-photographed aerial image may be overlaid on the pre-generated first travel map and provided to the user to allow the user to easily identify the second map.

Similar to the first travel map, generating the second travel map may include a second image mapping operation of generating a second travel image of a 3D region using the re-photographed aerial image, and a second map displaying operation of dividing the second travel image into a mowing region where a lawn is present and an obstacle region distinguished from the mowing region, converting the second travel image into a second travel map of a 2D region and displaying the second travel map.

In the second travel map, an anchor corresponds to a region whose elevation rapidly increases on the ground, and thus it may be distinguished as an obstacle region. Therefore, it may be easy to identify the installation location of the anchor on the second travel map.

Once the second travel map is overlaid on the first travel map through the second anchor location displaying of overlaying and displaying the second travel map on the first travel map, the user may easily determine whether the anchor has been properly installed by comparing the location of the anchor recommended on the first travel map with the installation location of the anchor shown on the second travel map.

The second travel map may also be modified by the user. When the second travel map is generated, a path of the lawn mower robot may be generated from the second travel map or may be generated from the first travel map by reflecting the content of the second travel map in the first travel map. That is, the first travel map or the second travel map may not be used alone in generating the path of the lawn mower robot.

The anchor A need not be installed to exactly match the installation location recommended in the first anchor displaying operation S3. The recommendation of the installation location of the anchor A is merely to provide an optimized place. Therefore, the user may install the anchor A at a location different from the recommended location due to an installation-related issue, or may have a larger number of anchors A than the recommended number of anchors A and thus install additional anchors at other locations.

Once the locations where the anchors A are installed are determined through the anchor location determination operation S4, the path generation operation S6 of generating a travel path of the lawn mower robot may be performed. In order to generate the travel path of the lawn mower robot, a first coordinate conversion operation S5 may be performed, in which a location is converted into coordinate values available to the lawn mower robot so as to determine the location on the first travel map or the second travel map.

The coordinate values available to the lawn mower robot may be converted into anchor location-based coordinates by receiving an input of coordinate setting values of the anchor A with the installation location of the anchor A extracted.

Figure 7:
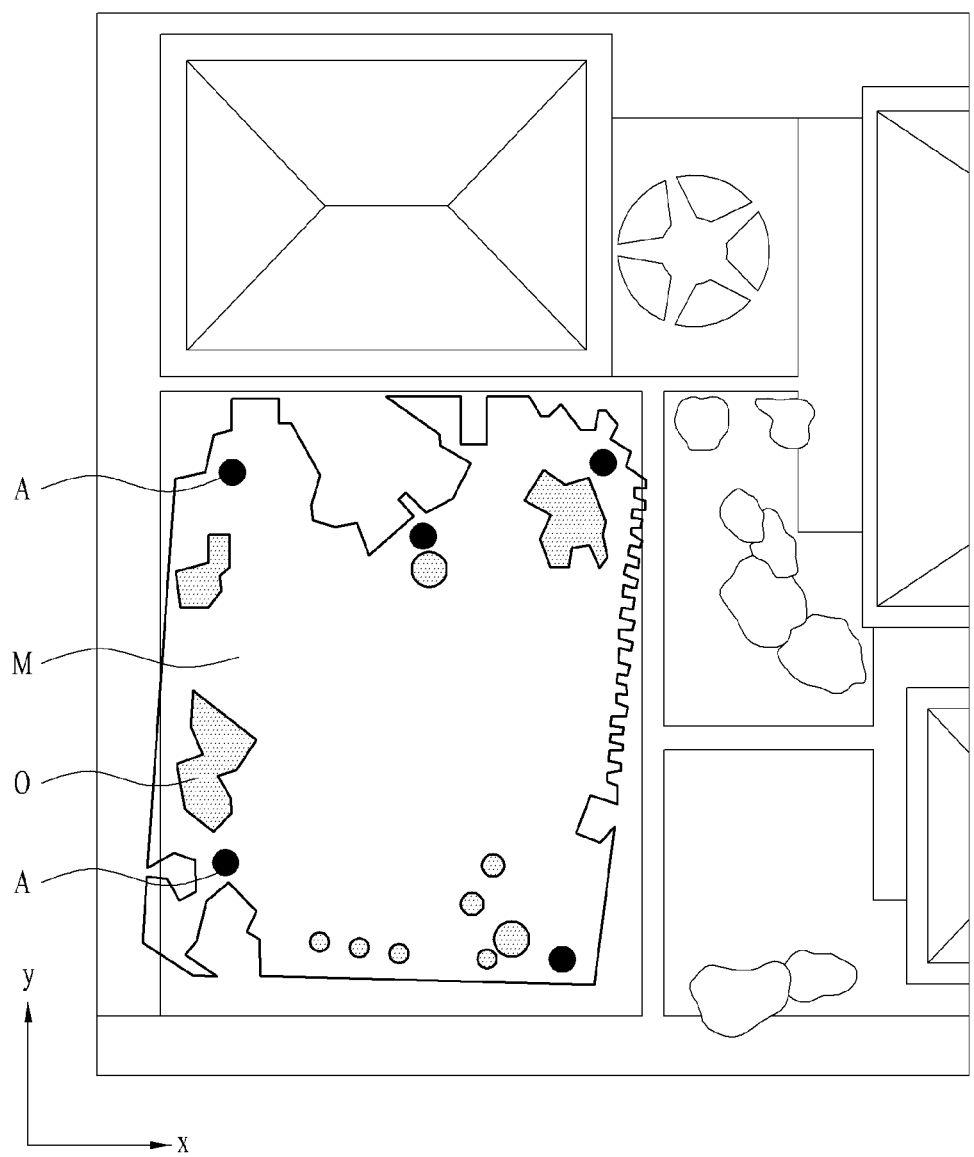

Referring to FIG. 7, a coordinate system may be set based on a specific location, and the locations where the anchors A are installed with respect to the coordinate system may be represented by coordinate values. Once the coordinate values of the anchors A are set, the relative locations between the anchors A or between the anchors A and the lawn mower robot may be represented by coordinate values.

The coordinate values may be converted according to where the user installs the anchors A. Thus, the lawn mowing may be performed by selecting a region where lawn mowing is to be substantially performed, regardless of the specificity of the terrain.

The method may include a map updating operation S7 of updating the map while the lawn mower robot 1 actually travels the work target region along the travel path of the lawn mower robot generated in the path generation operation S6.

As described above, when a path along which the lawn mower robot is to travel is generated on the first travel map or the second travel map after the anchors A are installed, the lawn mower robot may update the travel map while actually traveling the work target region. The travel map may be updated based on a sensor provided in the lawn mower robot. The sensor of the lawn mower robot may calculate roll, pitch, and/or yaw values of the lawn mower robot. Therefore, the lawn mower robot may acquire terrain information such as the location of the lawn mower robot on the travel map, and the height and inclination at the location. By updating the travel map based on the travel of the lawn mower robot, a more precise travel map may be completed.

Figure 4:
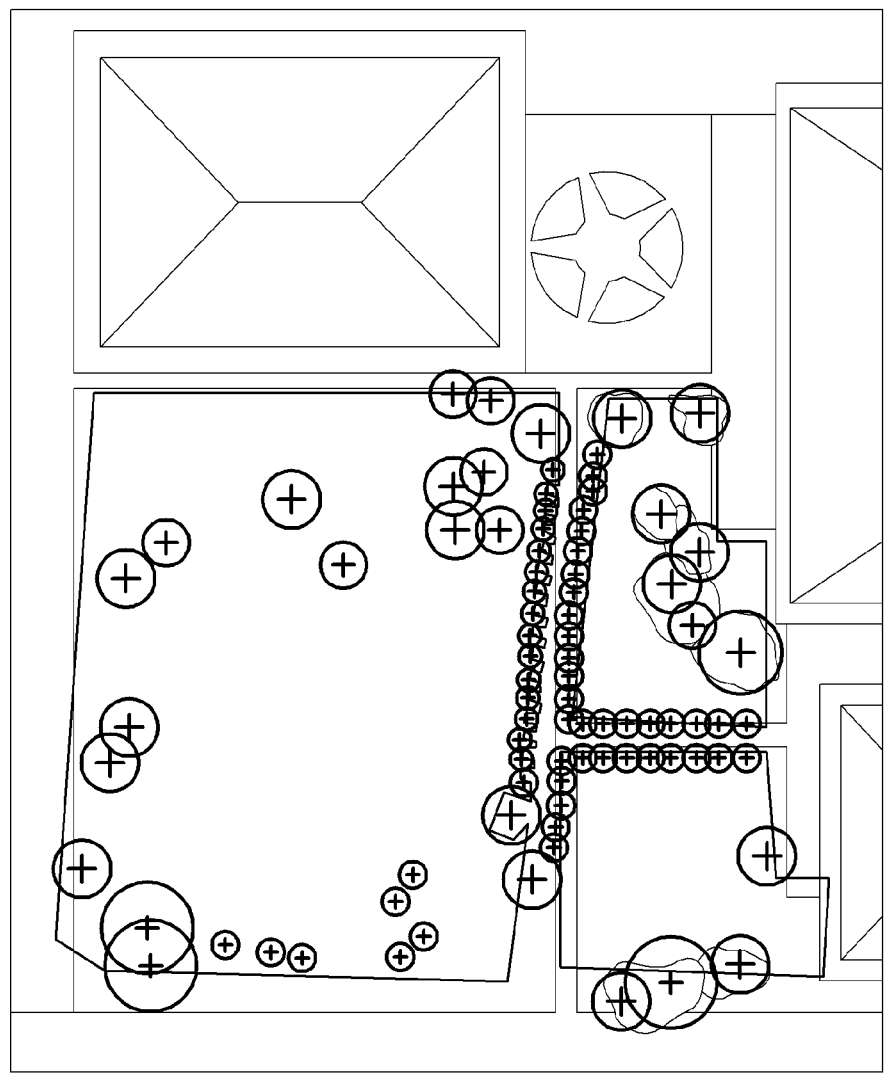
FIGS. 4 to 7 illustrate examples of the mapping method of the lawn mower robot.
Figure 5:
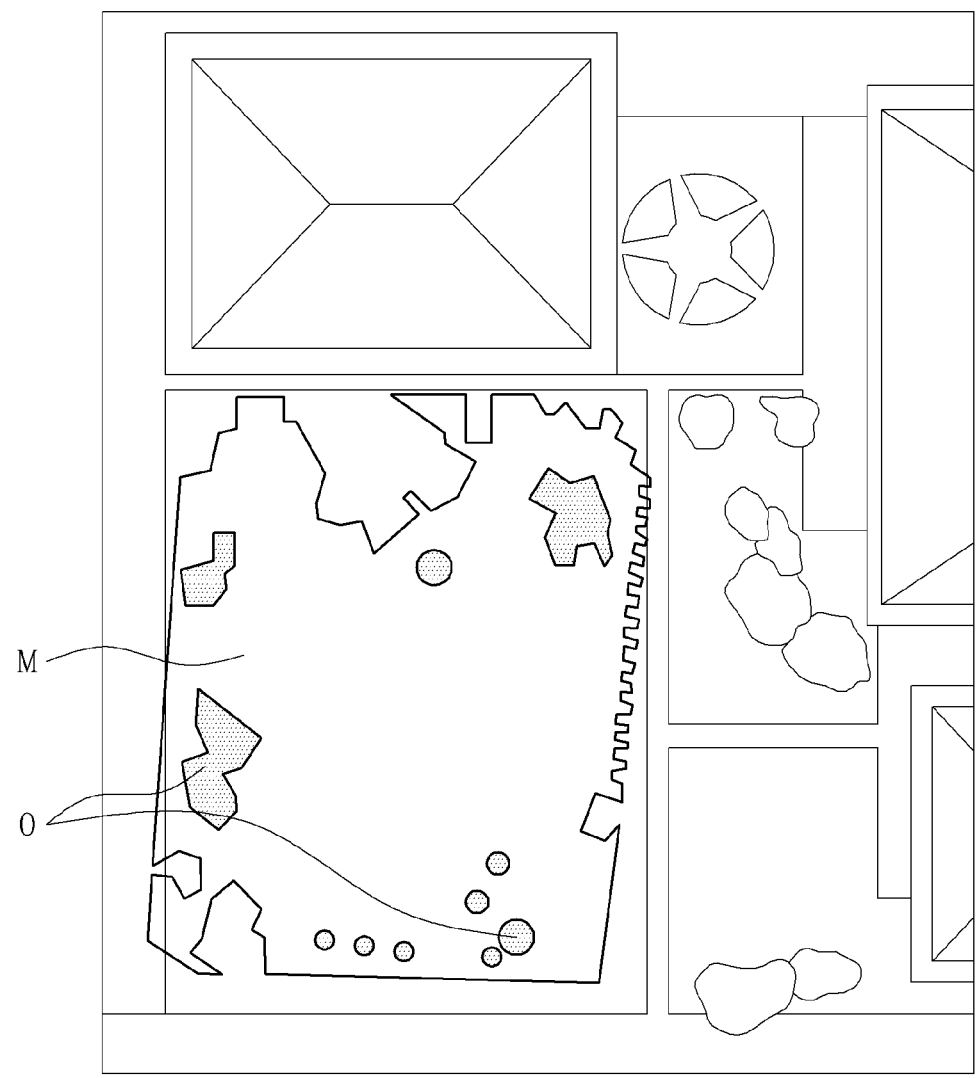
Figure 6:
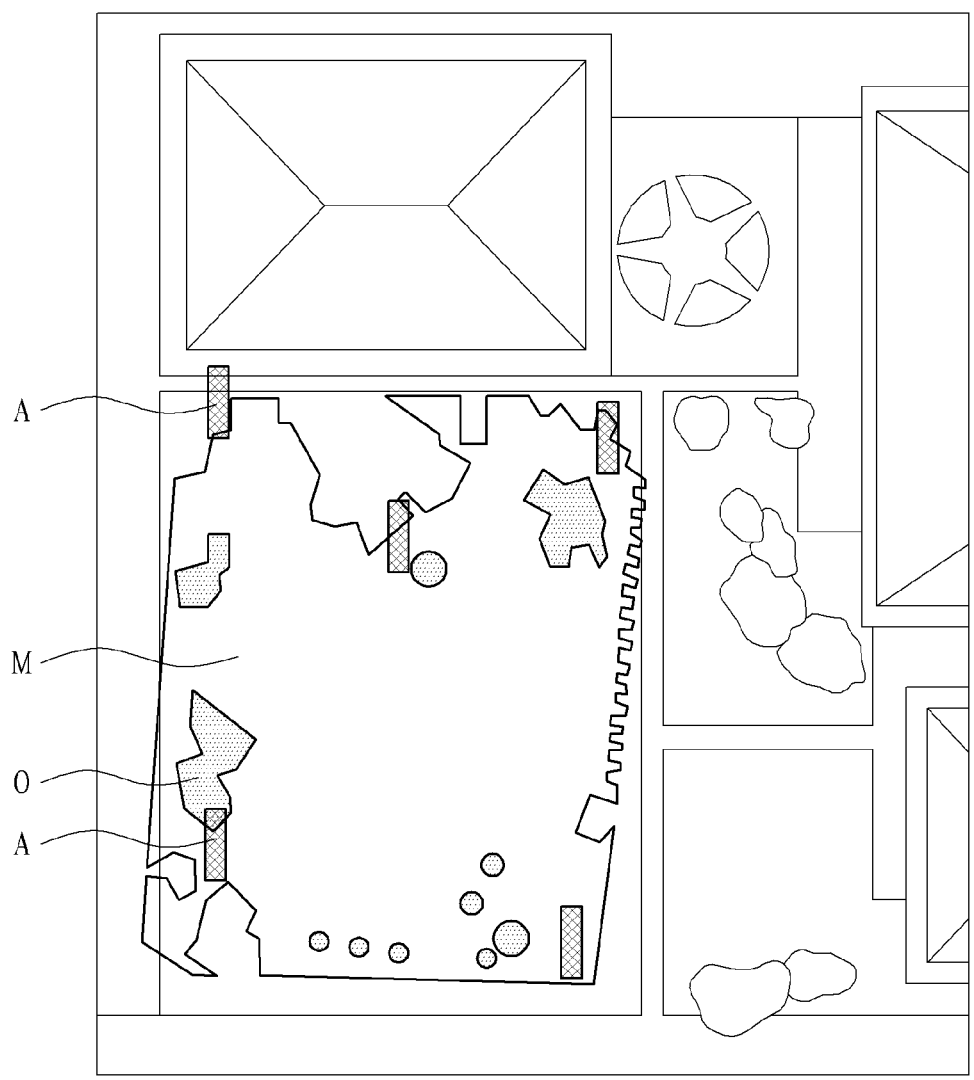

FIG. 4 illustrates a mowing region and an obstacle region which are distinguished in the first map displaying operation. FIG. 5 illustrates displaying the mowing region and the obstacle region on the first travel map. FIG. 6 illustrates displaying the number of anchors and recommended installation locations. FIG. 7 shows a travel map reflecting the locations where the anchors are installed.

Since the travel map is overlaid and displayed on an aerial image of the actual work target region viewed from above, the provided travel map may be easily understood by the user.

Figure 8:
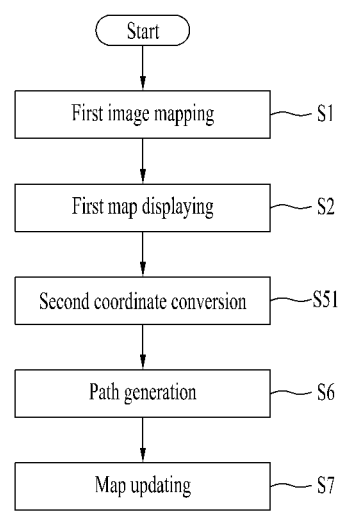
FIG. 8 illustrates a mapping method of a lawn mower robot according to another embodiment.
Figure 9:
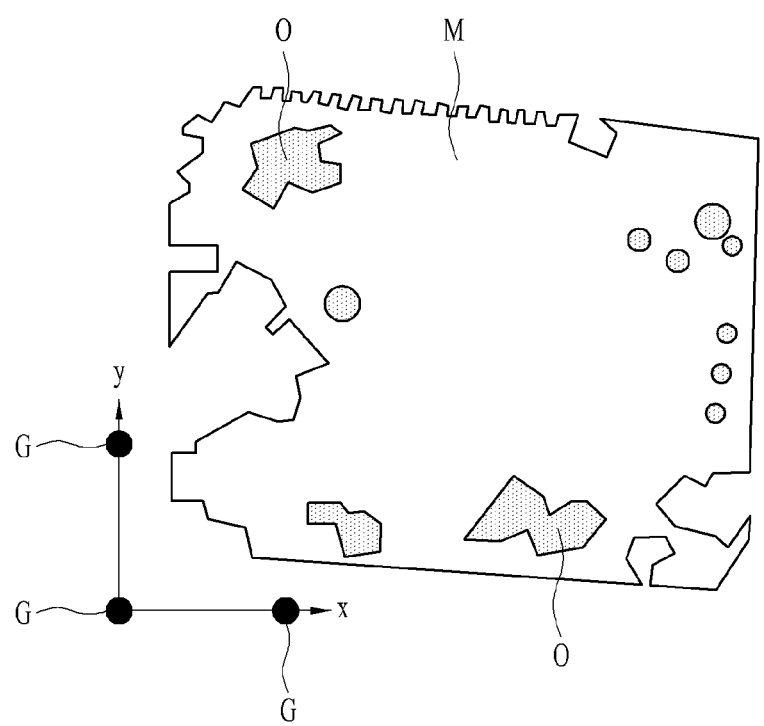
FIG. 9 illustrates examples of the mapping method of the lawn mower robot according to the embodiment of FIG. 8.

FIG. 8 illustrates a mapping method of a lawn mower robot according to another embodiment. FIG. 9 illustrates examples of the mapping method of the lawn mower robot according to the FIG. 8 embodiment. In describing the mapping method of a lawn mower robot according the FIG. 8 embodiment, description of features which are the same as those of the mapping method of the lawn mower robot according to the previous embodiment may be omitted. Therefore, generation of a travel map and a path does not solely depend on the parts described below.

Referring to FIG. 8, after the first image mapping S1 is completed, the first map displaying operation S2 may be performed. Thereafter, a GPS sensor G may be installed in the work target region. After the GPS sensor G is installed, an aerial image may be re-captured so as to include the GPS sensor G. The aerial image may be captured by the aerial image capturing unit of the previous embodiment.

The mapping method according to this embodiment may include a second coordinate conversion operation S51. One GPS sensor G may be provided, or a plurality of GPS sensors G may be provided. For example, three or more GPS sensors G may be provided. When multiple GPS sensors G are provided, they may be installed to form coordinate axes. Once the GPS sensors G are installed to form coordinate axes, a coordinate system may be set based on the GPS sensors G.

An aerial image may be photographed by installing a specific location in the work target region may be set as an origin, and one GPS sensor may be installed at the origin, one GPS sensor may be installed at any position on the x-axis, and one GPS sensor may be installed at any position on the y-axis. Values of the location and installation places of the GPS sensors G may be recorded to perform coordinate conversion with the travel map.

The GPS sensors G may be removed after the coordinate values are set on the travel map based on the aerial image. That is, leaving the GPS sensors G unremoved may increase obstacle regions.

Figure 10:
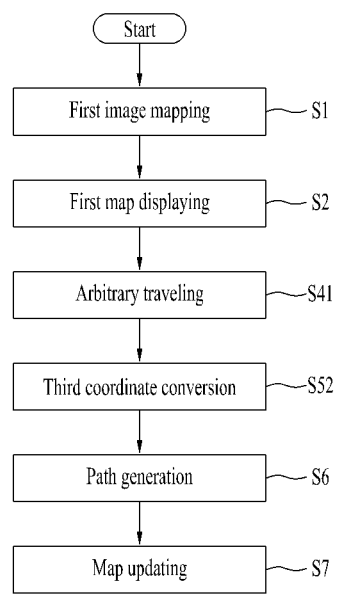
FIG. 10 illustrates a mapping method of a lawn mower robot according to yet another embodiment.

FIG. 10 illustrates a mapping method of a lawn mower robot according to another embodiment. In describing the mapping method of a lawn mower robot according the FIG. 10 embodiment, description of features which are the same as those of the mapping methods of the lawn mower robot according to the previous embodiments may be omitted. Unlike the embodiment described with reference to FIG. 9, the lawn mower robot according to this embodiment may include a GPS sensor.

After the first image mapping operation S1 and the first map displaying operation S2 are performed, an arbitrary traveling operation S41 of causing the lawn mower robot to travel within the work target region may be performed.

The lawn mower robot may move along any path. The work target region may be re-photographed by the aerial image capturing unit while the lawn mower robot is moving. When the aerial image capturing unit captures multiple aerial images, the position of the lawn mower robot in the work target region may differ among the aerial images. In this example, since the lawn mower robot may be provided with a GPS sensor, the location of the lawn mower robot and the position thereof on the travel map may be determined to calculate a relationship between the GPS sensor and the travel map or a conversion equation thereof.

The mapping method of the lawn mower robot according to this embodiment may include a third coordinate conversion operation S52 of calculating coordinates available to the lawn mower robot on the travel map based on the location information about the lawn mower robot collected in the arbitrary traveling operation S41 and the aerial images captured during the arbitrary traveling. Thereafter, a travel path of the lawn mower robot may be generated on the travel map to perform lawn mowing.

As apparent from the above description, the present disclosure has effects as follows. A mapping method of the lawn mower robot according to embodiments does not require installation of a wire or the like to perform lawn mowing. As a real-time update or the current state is well reflected, the work capacity of the lawn mower robot may be improved. The user may be allowed to easily determine a work target region and a mowing area. The user is allowed to modify the travel map, and therefore user convenience may be enhanced. The location of the lawn mower robot may be identified to enable an optimized travel of the lawn mower robot. The mapping method of the lawn mower robot may generate a slope-based travel path, thereby enabling efficient work.

With the mapping method of the lawn mower robot, a boundary and obstacles may be easily registered on a travel map, and various shapes of work target regions may be accurately mapped.

Accordingly, the present disclosure is directed to a mapping method of a lawn mower robot that substantially obviates one or more problems due to limitations and disadvantages of the related art.

An object of the present disclosure is to provide a mapping method of a lawn mower robot which does not require installation of a wire or the like in setting a boundary for the lawn mower robot.

Another object of the present disclosure is to provide a mapping method of a lawn mower robot capable of providing a travel map that well reflects.

Another object of the present disclosure is to provide a mapping method of a lawn mower robot capable of automatically mowing the lawn by clearly distinguishing an obstacle area.

Another object of the present disclosure is to provide a mapping method of a lawn mower robot capable of modifying a travel map.

Another object of the present disclosure is to provide a mapping method of a lawn mower robot capable of identifying the location of the lawn mower robot to enable an optimized travel of the lawn mower robot.

As an example for solving the above problems, provided is a method for generating a first travel map (including a boundary and obstacles) based on analysis of aerial images captured by an aerial vehicle such as a drone such that a user modify or add to the travel map through a user interface (UI) and the travel map is actually and directly used by a robot.

In addition, provided is a mapping method of a lawn mower robot using an aerial photographing device, a UI program, and an anchor for position recognition through, for example, ultra-wideband (UWB).

In addition, provided is a mapping method of a lawn mower robot capable of updating 3D information about a map using a sensor (s GPS sensor, a gyro sensor, an acceleration sensor, a geomagnetic sensor, a vision sensor, etc.) mounted on the robot.

In one aspect of the present disclosure, a mapping method of a lawn mower robot, the method may include a first image mapping operation of generating a first travel image of a three-dimensional region based on an aerial image captured by photographing a work target region, the lawn mower robot being allowed to travel in the three-dimensional region, a first map displaying operation of dividing the first travel image into a mowing region to be mowed and an obstacle region distinguished from the mowing region, converting the first travel image into a first travel map of a two-dimensional region, and displaying the first travel map, a first anchor displaying operation of recommending the number and installation locations of anchors for recognition of a location of the lawn mower robot on the first travel map when the mowing region and the obstacle region are divided, an anchor location determination operation of determining whether the anchors are installed at the installation locations, and a path generation operation of generating a travel path of the lawn mower robot on the first travel map. The first image mapping operation may include a collection operation of collecting a plurality of aerial images captured by photographing the work target region, a matching operation of extracting feature points based on the plurality of aerial images and matching the feature points, and a reconstruction operation of generating a grid map using interpolation. The obstacle region may include a region formed to have an inclination greater than a predetermined inclination even when a lawn is present in the region. The first travel map may be displayed so as to allow a user to modify at least one of a location and size of each of the mowing region and the obstacle region. The first travel map may be overlaid and displayed on an image of the work target region viewed from an upper side of the work target region among the captured aerial images. In the first anchor displaying operation, the number and installation locations of anchors for recognition of the location of the lawn mower robot are displayed based on the mowing region and the obstacle region. The anchor location determination operation may include a second image mapping operation of generating a second travel image of a three-dimensional region using an aerial image captured after installation of the anchors, a second map displaying operation of dividing the second travel image into a mowing region containing a lawn and an obstacle region distinguished from the mowing region, converting the second travel image into a second travel map of a two-dimensional region, and displaying the second travel map, and a second anchor location displaying operation of displaying the first travel map and the second travel map in an overlaid manner. They may further include a first coordinate conversion operation of converting locations into coordinates available to the lawn mower robot based on set coordinate values of the installed anchors on the second travel map. The method may further include a map updating operation of modifying the first travel map based on roll, pitch, and yaw information about the lawn mower robot while the lawn mower robot travels after the path is generated.

In another aspect of the present disclosure, a mapping method of a lawn mower robot may include a first image mapping operation of generating a first travel image of a three-dimensional region based on an aerial image captured by photographing a work target region, the lawn mower robot being allowed to travel in the three-dimensional region, a first map displaying operation of dividing the first travel image into a mowing region to be mowed and an obstacle region distinguished from the mowing region, converting the first travel image into a first travel map of a two-dimensional region, and displaying the first travel map, a second coordinate conversion operation of inputting a coordinate value to the first travel map based on a captured aerial image including a global positioning system (GPS) sensor installed in the work target region, and a path generation operation of generating a travel path of the lawn mower robot on the first travel map. The first image mapping operation may include a collection operation of collecting a plurality of aerial images captured by photographing the work target region, a matching operation of extracting feature points based on the plurality of aerial images and matching the feature points, and a reconstruction operation of generating a grid map using interpolation. The obstacle region may include a region formed to have an inclination greater than a predetermined inclination even when a lawn is present in the region. The first travel map may be displayed so as to allow a user to modify at least one of a location and size of each of the mowing region and the obstacle region. The GPS sensor may employ at least three GPS sensors. The method may further include a map updating operation of modifying the first travel map based on roll, pitch, and yaw information about the lawn mower robot while the lawn mower robot travels after the path is generated.

In another aspect of the present disclosure, a mapping method of a lawn mower robot may include a first image mapping operation of generating a first travel image of a three-dimensional region based on an aerial image captured by photographing a work target region, the lawn mower robot being allowed to travel in the three-dimensional region, a first map displaying operation of dividing the first travel image into a mowing region to be mowed and an obstacle region distinguished from the mowing region, converting the first travel image into a first travel map of a two-dimensional region, and displaying the first travel map, an arbitrary travel operation of causing a lawn mower robot including a GPS sensor to travel in the work target region, a third coordinate conversion operation of calculating coordinates available to the lawn mower robot from the first travel map based on location information about the lawn mower robot collected in the arbitrary travel operation and aerial images captured during the arbitrary travel operation, and a path generation operation of generating a travel path of the lawn mower robot on the first travel map.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mapping method for a lawn mower, the method comprising:
   generating a first travel image of a three-dimensional region based on an aerial image captured by photographing a work target region;
   converting the first travel image into a first travel map of a two-dimensional region by dividing the first travel image into a mowing region and an obstacle region distinguished from the mowing region;
   recommending the number and installation locations of anchors for recognition of a location of the lawn mower on the first travel map;
   determining whether the anchors are installed at the installation locations; and
   generating a travel path of the first travel map for the lawn mower,
   wherein the generating of the first travel image includes:
      extracting feature points from a plurality of aerial images including the work target region; and
      generating a grid map using interpolation to match the feature points,
   wherein the number and installation locations of anchors for recognition of the location of the lawn mower are marked on the first travel map based on the mowing region and the obstacle region, and
   wherein the determining whether the anchors are installed includes:
      generating a second travel image of a three-dimensional region using an aerial image captured after installation of the anchors;
      converting the second travel image into a second travel map of a two-dimensional region by dividing the second travel image into a mowing region and an obstacle region, and
      overlaying the first travel map with the second travel map.

2. The method of claim 1, wherein the obstacle region includes a region formed to have an inclination greater than a predetermined inclination.

3. The method of claim 1, comprising modifying at least one of a location and a size of each of the mowing region and the obstacle region marked on the first travel map.

4. The method of claim 1, comprising overlaying the first travel map on an image of the work target region based on a captured aerial image.

5. The method of claim 1, further comprising:
converting locations into coordinates available to the lawn mower based on set coordinate values of the installed anchors on the second travel map.

6. The method of claim 1, further comprising:
modifying the first travel map based on roll, pitch, and yaw information about the lawn mower while the lawn mower moves along the generated path.

7. The method of claim 1, wherein the mowing region is a region to be mowed, and the obstacle region is marked to be distinguished from the mowing region.

\* \* \* \* \*